United States Patent
Tiruveedhula et al.

(10) Patent No.: US 10,110,470 B2
(45) Date of Patent: Oct. 23, 2018

(54) PREVENTING DATA TRAFFIC LOOPS ASSOCIATED WITH DESIGNATED FORWARDER SELECTION

(71) Applicant: Juniper Networks, Inc., Sunnyvale, CA (US)

(72) Inventors: Maruthi Kishore Tiruveedhula, Nashua, NH (US); Rukesh Dorai, Sunnyvale, CA (US); Sudhin Jacob, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 71 days.

(21) Appl. No.: 15/265,304

(22) Filed: Sep. 14, 2016

(65) Prior Publication Data
US 2018/0077050 A1    Mar. 15, 2018

(51) Int. Cl.
*H04L 12/28* (2006.01)
*H04L 12/705* (2013.01)
*H04L 12/46* (2006.01)
*H04L 12/751* (2013.01)
*H04L 12/707* (2013.01)
*H04L 29/12* (2006.01)
*H04L 12/24* (2006.01)
(Continued)

(52) U.S. Cl.
CPC .......... *H04L 45/18* (2013.01); *H04L 12/4641* (2013.01); *H04L 12/4679* (2013.01); *H04L 45/02* (2013.01); *H04L 45/24* (2013.01); *H04L 61/6077* (2013.01); *H04L 61/6095* (2013.01); *H04L 41/08* (2013.01); *H04L 45/04* (2013.01); *H04L 45/66* (2013.01)

(58) Field of Classification Search
CPC ......... H04L 45/02; H04L 45/18; H04L 45/24; H04L 12/4641; H04L 12/4679; H04L 61/6077; H04L 61/6095
See application file for complete search history.

(56) References Cited

U.S. PATENT DOCUMENTS 8,953,590 B1 *   2/2015  Aggarwal ........... H04L 12/4675
                                                370/389
9,397,931 B1 *   7/2016  Mohanty ................. H04L 45/28
(Continued)

OTHER PUBLICATIONS

NetworkLessons.com, "Multicast Bidirectional PIM," https://networklessons.com/multicast/multicast-bidirectional-pim/, Mar. 26, 2013, 14 pages.
(Continued)

*Primary Examiner* — Kevin Mew
(74) *Attorney, Agent, or Firm* — Harrity & Harrity, LLP

(57) ABSTRACT

A device may receive a route identifier that includes a range identifier or a configuration identifier. The range identifier may identify a range of broadcast domain identifiers associated with a first device. The configuration identifier may identify an Ethernet segment identifier (ESI) configuration of the first device. The device may identify the range identifier or the configuration identifier included in the route identifier. The device may select a designated forwarder from among multiple devices based on the range of broadcast domain identifiers or based on identifying the configuration identifier. The designated forwarder may be the same designated forwarder selected by at least one other device.

20 Claims, 12 Drawing Sheets

(51) Int. Cl.
H04L 12/721 (2013.01)
H04L 12/715 (2013.01)

(56) References Cited

U.S. PATENT DOCUMENTS

| | | | |
|---|---|---|---|
| 9,832,097 B2* | 11/2017 | Balus | H04L 45/00 |
| 2005/0201372 A1* | 9/2005 | Hares | H04L 45/02 |
| | | | 370/389 |
| 2011/0069711 A1* | 3/2011 | Jha | H04L 12/4625 |
| | | | 370/395.53 |
| 2011/0286452 A1* | 11/2011 | Balus | H04L 12/4641 |
| | | | 370/390 |
| 2013/0301472 A1* | 11/2013 | Allan | H04L 45/66 |
| | | | 370/254 |
| 2014/0226531 A1* | 8/2014 | Farkas | H04L 41/0893 |
| | | | 370/256 |
| 2016/0261487 A1* | 9/2016 | Singh | H04L 12/4641 |
| 2016/0277210 A1* | 9/2016 | Lin | H04L 12/4625 |
| 2017/0093611 A1* | 3/2017 | Arora | H04L 41/0654 |
| 2017/0141963 A1* | 5/2017 | Chalapathy | H04L 41/12 |
| 2017/0195199 A1* | 7/2017 | Dorai | H04L 43/0811 |
| 2017/0201389 A1* | 7/2017 | Tiruveedhula | H04L 12/1886 |
| 2017/0250904 A1* | 8/2017 | Singarayan | H04L 12/4641 |
| 2017/0339052 A1* | 11/2017 | Arora | H04L 12/4641 |
| 2017/0373973 A1* | 12/2017 | Bickhart | H04L 45/741 |
| 2018/0006995 A1* | 1/2018 | Bickhart | H04L 61/103 |
| 2018/0034667 A1* | 2/2018 | Sharma | H04L 12/4675 |
| 2018/0109444 A1* | 4/2018 | Sajassi | H04L 45/28 |

OTHER PUBLICATIONS

Juniper Networks, "EVPN Multihoming Overview," https://www.juniper.net/techpubs/en_US/junos15.1/topics/concept/evpn-bgp-multihoming-overview.html, Aug. 30, 2016, 12 pages.
Wikipedia, "Virtual private network," https://en.wikipedia.org/wiki/Virtual_private_network, Sep. 1, 2016, 9 pages.
Sajassi et al., "BGP MPLS-Based Ethernet VPN," https://tools.ietf.org/html/rfc7432, Feb. 2015, 57 pages.
Mohanty, "A new Designated Forwarder Election for the EVPN," https://tools.ietf.org/html/draft-mohanty-l2vpn-evpn-df-election-00, Sep. 3, 2014, 12 pages.
Sajassi et al., "E-VPN Ethernet Segment Route," https://tools.ietf.org/html/draft-sajassi-l2vpn-evpn-segment-route-00, Jul. 4, 2011, 15 pages.
Wikipedia, "Multihoming," https://en.wikipedia.org/wiki/Multihoming, Sep. 7, 2016, 4 pages.
Sajassi, "BGP MPLS Based Ethernet VPN," https://tools.ietf.org/html/draft-ietf-l2vpn-evpn-11, Oct. 18, 2014, 53 pages.
Wikipedia, "Customer edge," https://en.wikipedia.org/wiki/Customer_edge, Jan. 14, 2016, 1 page.
Wikipedia, "Provider Edge," https://en.wikipedia.org/wiki/Provider_Edge, Aug. 19, 2015, 1 page.
Aggarwal et al., "BGP MPLS Based Ethernet VPN," Sep. 12, 2011, 42 pages.
Mohanty et al., "A new Designated Forwarder Election for the EVPN," Apr. 6, 2016, 15 pages.
Sajassi et al., "BGP MPLS-Based Ethernet VPN," Feb. 2, 2015, pp. 56 pages.
Extended European Search Report corresponding to EP 16198982.7 dated May 12, 2017, 15 pages.

* cited by examiner

PREVENTING DATA TRAFFIC LOOPS ASSOCIATED WITH DESIGNATED FORWARDER SELECTION

BACKGROUND

Multihoming can be useful for connecting a host or network to multiple networks in order to increase reliability, to improve performance, and/or to decrease cost. Multihoming is the practice of connecting a host or a network to more than one network. For example, a mobile phone may be connected to a Wi-Fi network and a third generation (3G) network simultaneously. Multihoming may increase reliability by providing multiple links for packets (e.g., Internet Protocol (IP) packets), so that if a link fails, the packets can be routed through other links. A multihomed host may be assigned multiple addresses (e.g., IP addresses), one per connected network.

SUMMARY

According to some possible implementations, a device may receive a route identifier that includes a range identifier or a configuration identifier. The range identifier may identify a range of broadcast domain identifiers associated with a first device. The configuration identifier may identify an Ethernet segment identifier (ESI) configuration of the first device. The device may identify the range identifier or the configuration identifier included in the route identifier. The device may select a designated forwarder from among multiple devices based on the range of broadcast domain identifiers or based on identifying the configuration identifier. The designated forwarder may be the same designated forwarder selected by at least one other device.

According to some possible implementations, a non-transitory computer-readable medium may store one or more instructions that, when executed by one or more processors, cause the one or more processors to receive, from multiple provider edge devices, multiple route identifiers that include multiple range identifiers or multiple configuration identifiers. The multiple range identifiers or the multiple configuration identifiers may be included in a type-length-value (TLV) element of the multiple route identifiers. A first range identifier included in a first route identifier of the multiple route identifiers may be different than a second range identifier included in a second route identifier of the multiple route identifiers. A first configuration identifier included in the first route identifier may be different than a second configuration identifier included in the second route identifier. The one or more instructions may cause the one or more processors to extract the multiple range identifiers or the multiple configuration identifiers from the TLV element of the multiple route identifiers. The one or more instructions may cause the one or more processors to identify the multiple range identifiers or the multiple configuration identifiers based on extracting the multiple range identifiers or the multiple configuration identifiers. The one or more instructions may cause the one or more processors to elect a designated forwarder from among the multiple provider edge devices using an algorithm. The algorithm may be the same algorithm used by the multiple provider edge devices to elect the same designated forwarder.

According to some possible implementations, a method may include receiving, by a device, one or more route identifiers from one or more other devices. The one or more route identifiers may include one or more range identifiers associated with one or more ranges of broadcast domain identifiers configured on the one or more other devices, or one or more configuration identifiers associated with one or more ESI configurations of the one or more other devices. The method may include identifying, by the device, the one or more range identifiers or the one or more configuration identifiers included in the one or more route identifiers. The one or more range identifiers may include at least one range identifier that is different than a range identifier configured on another device. The one or more configuration identifiers may include at least one configuration identifier that is different than a configuration identifier configured on another device. The method may include selecting, by the device, a designated forwarder from among the device and the one or more other devices.

DETAILED DESCRIPTION

Figure 1A:
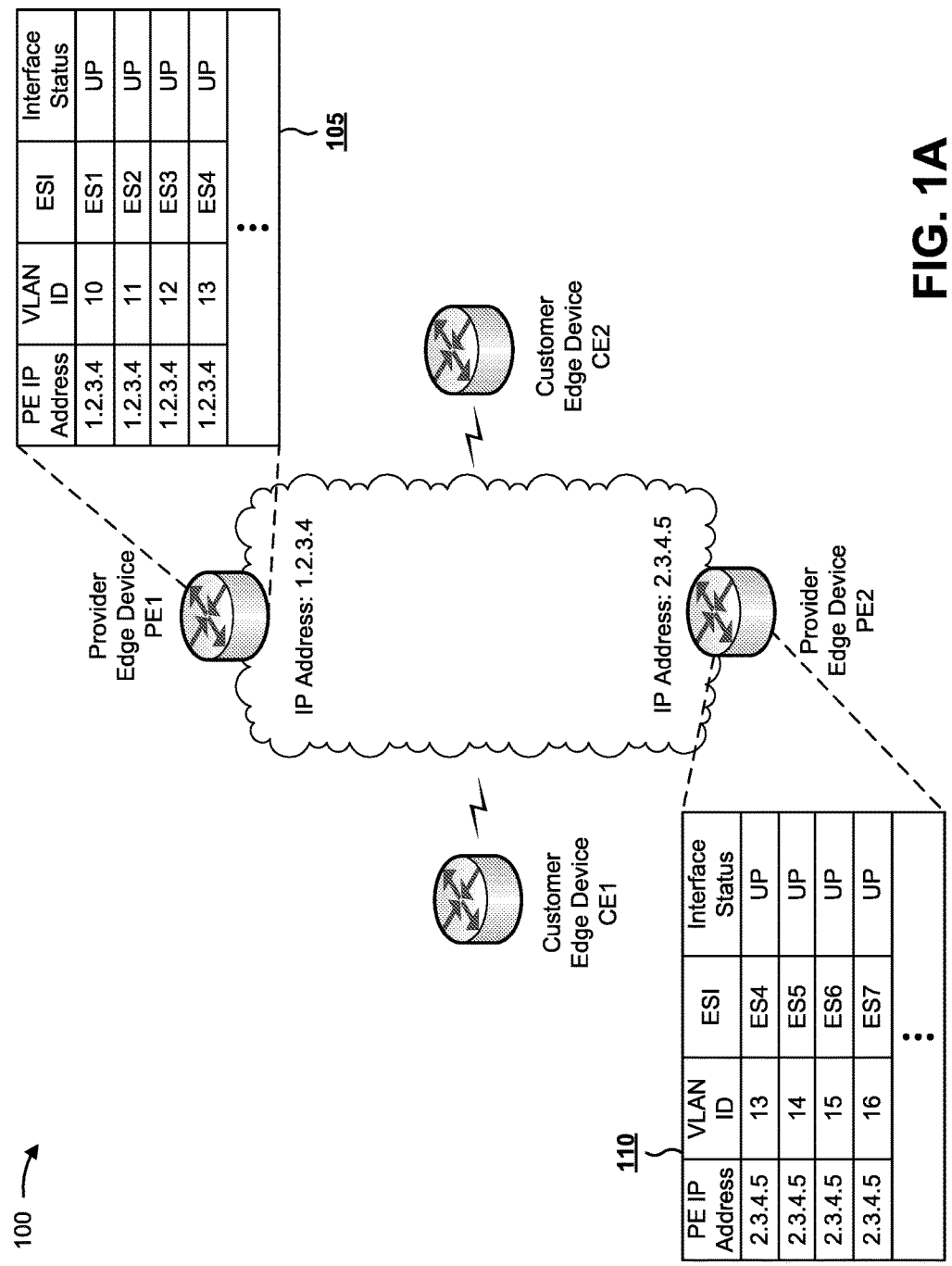
FIGS. 1A-1H are diagrams of an overview of an example implementation described herein.

The following detailed description of example implementations refers to the accompanying drawings. The same reference numbers in different drawings may identify the same or similar elements.

Multiple provider edge devices in a multihomed network may be configured to select (e.g., elect) one of the provider edge devices as a designated forwarder to forward network traffic to a customer edge device. As such, multihoming may provide redundant connectivity so that connectivity is provided even where a failure in the multihomed network is detected.

During designated forwarder selection, provider edge devices may use an algorithm, V mod N, to select the designated forwarder, where V is the lowest value virtual local area network (VLAN) identifier configured on a provider edge device and N is a quantity of provider edge devices that are multihomed to a particular Ethernet segment (e.g., a set of Ethernet links that connects two or more provider edge devices when a customer edge device is multihomed to the provider edge devices).

In some cases, multiple provider edge devices may have different configurations, such as due to a configuration error by a network administrator, due to one or more provider edge devices being a legacy provider edge device, or the like. For example, the different configurations may include different VLAN identifiers (e.g., associated with active VLANs). Application of the V mod N algorithm when provider edge devices have different VLAN identifiers may cause errors during the selection of a designated forwarder. For example, the different configurations may cause provider edge devices to select different designated forwarders. Selection of different designated forwarders may cause a layer 2 loop between the selected designated forwarders. For example, a layer 2 loop may occur when multiple provider edge devices in a multihomed environment are selected as designated forwarders, causing the designated forwarders to repeatedly exchange broadcast traffic, unknown unicast traffic, and multicast traffic (BUM traffic) without forwarding the BUM traffic to a customer edge device.

As an example, assume that a first provider edge device is configured with VLAN identifiers 4 through 10 and a second provider edge device is configured with VLAN identifiers 5 through 10. Based on the different minimum VLAN identifiers on each of the provider edge devices, (e.g., the first provider edge device has a minimum VLAN identifier of 4 and the second provider edge device has a minimum VLAN identifier of 5) application of the V mod N algorithm by the first provider edge device may cause the first provider edge device to select the first provider edge device as the designated forwarder and application of the V mod N algorithm by the second provider edge device may cause the second provider edge device to select the second provider edge device as the designated forwarder. Because both the first provider edge device and the second provider edge device have been selected as a designated forwarder, the first and second provider edge devices may attempt to forward BUM traffic to each other, resulting in a layer 2 loop.

In addition, or in other cases, the provider edge devices may have different Ethernet segment identifier (ESI) configurations. For example, a first provider edge device may be configured with an ESI per physical device and a second provider edge device may be configured with an ESI per subinterface (or VLAN). A mismatch between the ESI configurations of the first provider edge device and the second provider edge device may cause multiple provider edge devices to be selected as designated forwarders. Based on the multiple provider edge devices being selected as designated forwarders, both provider edge devices may forward BUM traffic to each other (e.g., a layer 2 loop).

In implementations described herein, provider edge devices may exchange route identifiers that include information identifying VLAN identifiers and ESI configurations. For example, when multihomed provider edge devices advertise type 4 routes to other provider edge devices in a common multihomed environment, one or more type-length-value (TLV) elements may be included with the type 4 route. The provider edge devices may use the TLV elements in the type 4 route to exchange VLAN identifiers and/or configuration identifiers (e.g., that identify whether a provider edge device is configured with an ESI per subinterface or an ESI per physical device). Having provider edge devices exchange route identifiers that include VLAN identifiers and/or configuration identifiers may enable provider edge devices with different configurations to select a designated forwarder using the same information, thereby reducing or eliminating layer 2 loops that may occur during designated forwarder selection.

FIGS. 1A-1H are diagrams of an overview of an example implementation 100 described herein. As shown in FIG. 1A, provider edge device PE1 and provider edge device PE2 may operate within a network, and may exchange traffic among each other and among customer edge device CE1 and customer edge device CE2. The environment shown in example implementation 100 may include a multihomed environment based on at least one customer edge device being connected to multiple provider edge devices.

As shown by reference number 105, provider edge device PE1 may store a table that includes IP addresses of 1.2.3.4 (e.g., PE IP Address) associated with VLAN identifiers 10, 11, 12, and 13 (e.g., VLAN ID). The table for provider edge device PE1 also shows that the VLAN identifiers are associated with ESIs ES1, ES2, ES3, and ES4. The table for provider edge device PE1 further shows that the IP addresses, VLAN identifiers, and ESIs are associated with an interface status of UP, indicating that provider edge device PE1 may use an associated interface to communicate. As further shown by reference number 105, provider edge device PE1 may be configured with an ESI per subinterface, as indicated by each VLAN identifier being associated with a different ESI.

As shown by reference number 110, provider edge device PE2 may store a table that includes IP addresses of 2.3.4.5 associated with VLAN identifiers 13, 14, 15, and 16. The table for provider edge device PE2 also shows that each of the VLAN identifiers are associated with an ESI (e.g., ES1, ES2, ES3, and ES4). The table for provider edge device PE2 also shows that the IP addresses, VLAN identifiers, and ESIs are associated with an interface status of UP. As further shown by reference number 110, provider edge device PE2 may be configured with an ESI per subinterface, as indicated by each VLAN identifier being associated with a different ESI.

As further shown in FIG. 1A, and by reference numbers 105 and 110, provider edge devices PE1 and PE2 may be configured with different ranges of VLAN identifiers (e.g., a range of 10 to 13 for PE1 and a range of 13 to 16 for PE2). In addition, the ranges of VLAN identifiers associated with each of provider edge devices PE1 and PE2 have different minimum VLAN identifiers (e.g., a minimum VLAN identifier of 10 for PE1 and a minimum VLAN identifier of 13 for PE2).

Figure 1B:
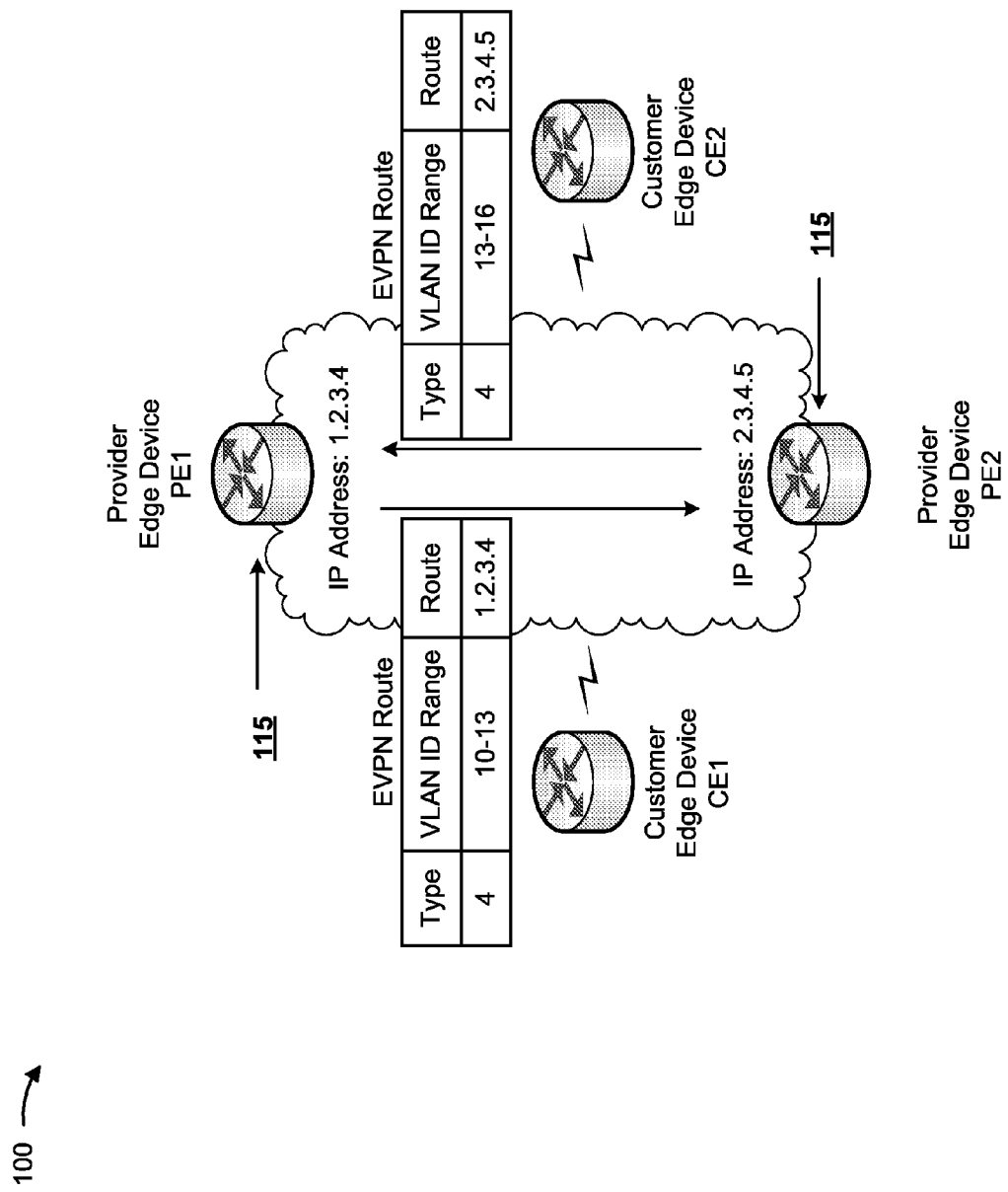

As shown in FIG. 1B, and by reference numbers 115, provider edge devices PE1 and PE2 may exchange Ethernet virtual private network (EVPN) routes that include information identifying a type of the EVPN route (e.g., Type), a VLAN identifier range (e.g., VLAN ID Range), and/or a route of the provider edge device (e.g., Route). The EVPN route from provider edge device PE1 may include information identifying the type of the route as a type 4 route, the VLAN identifier range as 10 to 13, and the route as IP address 1.2.3.4. The EVPN route from PE2 may include information identifying the type of the route as a type 4 route, the VLAN identifier range as 13 to 16, and the route as IP address 2.3.4.5.

Figure 1C:
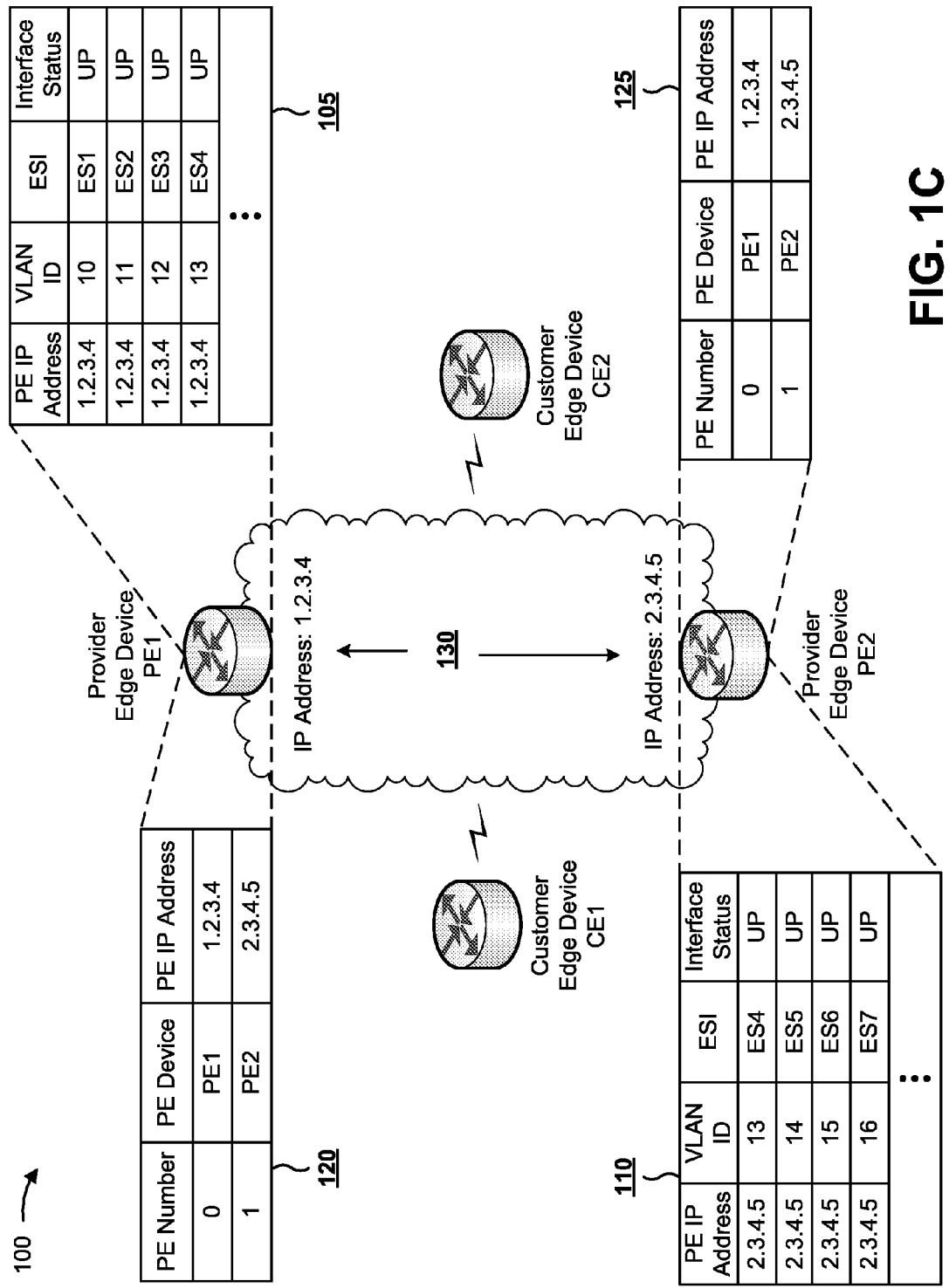

As shown in FIG. 1C, and by reference numbers 120 and 125, provider edge devices PE1 and PE2 may store tables of information about the provider edge devices PE1 and PE2 (e.g., based on exchanging EVPN routes). For example, the tables may be ordered by IP address (e.g., lowest to highest, highest to lowest, etc.). In addition, the tables may include a provider edge device number (e.g., PE number) for provider edge devices PE1 and PE2, a provider edge device identifier (e.g., PE Device) identifying provider edge devices PE1 and PE2, and an IP address associated with provider edge devices PE1 and PE2 (e.g., PE IP address).

As shown by reference number 130, provider edge devices PE1 and PE2 may identify a minimum common VLAN identifier between provider edge devices PE1 and PE2 by comparing the ranges of VLAN identifiers of provider edge devices PE1 and PE2 and may select (e.g., elect) a provider edge device as a designated forwarder. For example, provider edge devices PE1 and PE2 may identify VLAN identifier 13 as the minimum common VLAN identifier between provider edge devices PE1 and PE2 and may select provider edge device PE2 as the designated forwarder using the algorithm V mod N. Continuing with the previous example, provider edge devices PE1 and PE2 may use VLAN identifier 13 as V, based on 13 being the minimum common VLAN identifier, and 2 as N, based on there being two provider edge devices in the multihomed environment. Continuing with the previous example, 13 mod 2 equals 1, which provider edge devices PE1 and PE2 may correspond to PE number 1. Based on PE number 1 being associated with provider edge device PE2, as shown by reference numbers 120 and 125, provider edge devices PE1 and PE2 may select PE2 as the designated forwarder.

Figure 1D:
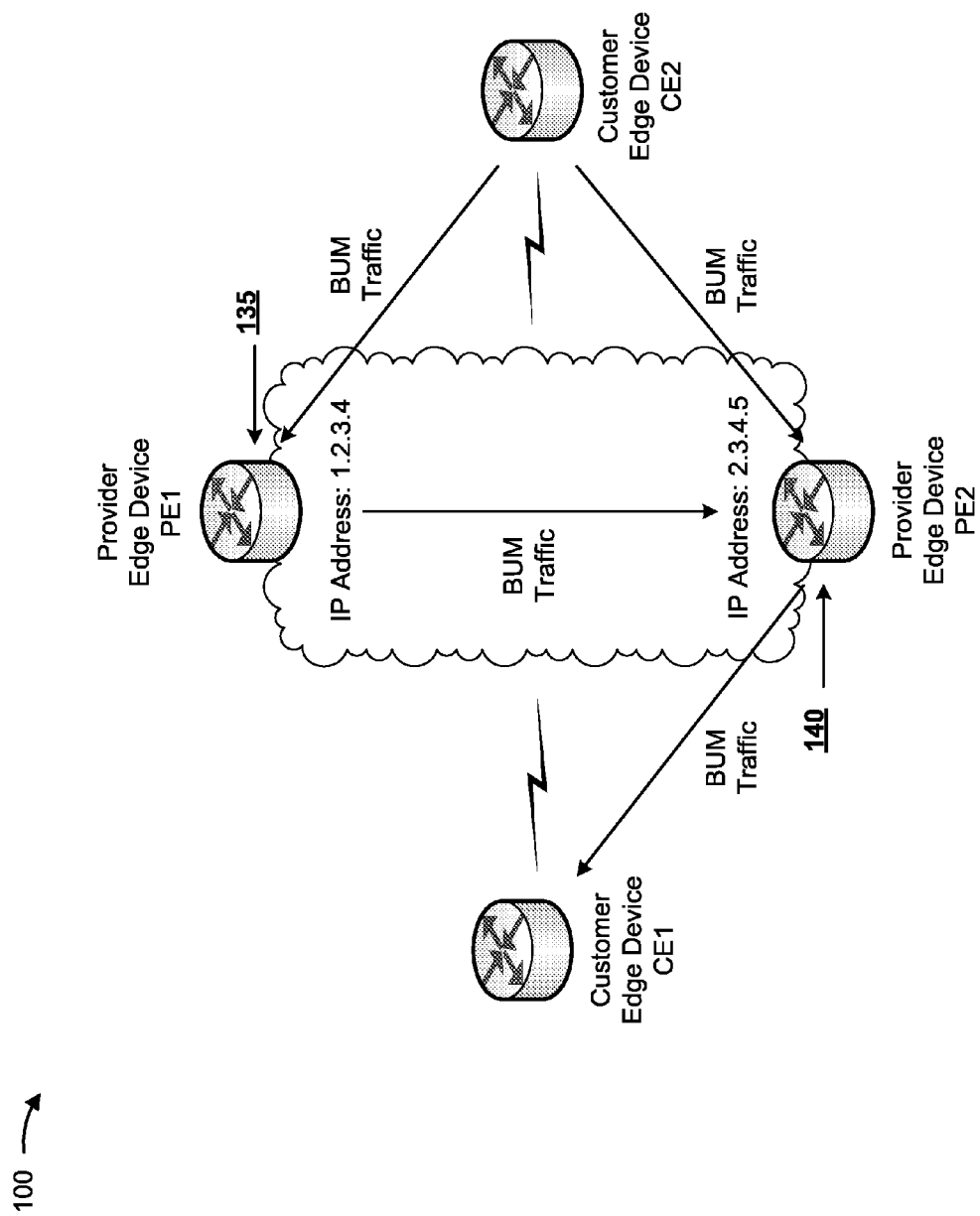

As shown in FIG. 1D, and by reference number 135, provider edge device PE1 may forward BUM traffic, received from customer edge device CE2, to provider edge device PE2 (e.g., based on provider edge device PE2 having been selected as the designated forwarder). As shown by reference number 140, provider edge device PE2 may forward BUM traffic, received from provider edge device PE1 and customer edge device CE2, to customer edge device CE1.

Figure 1E:
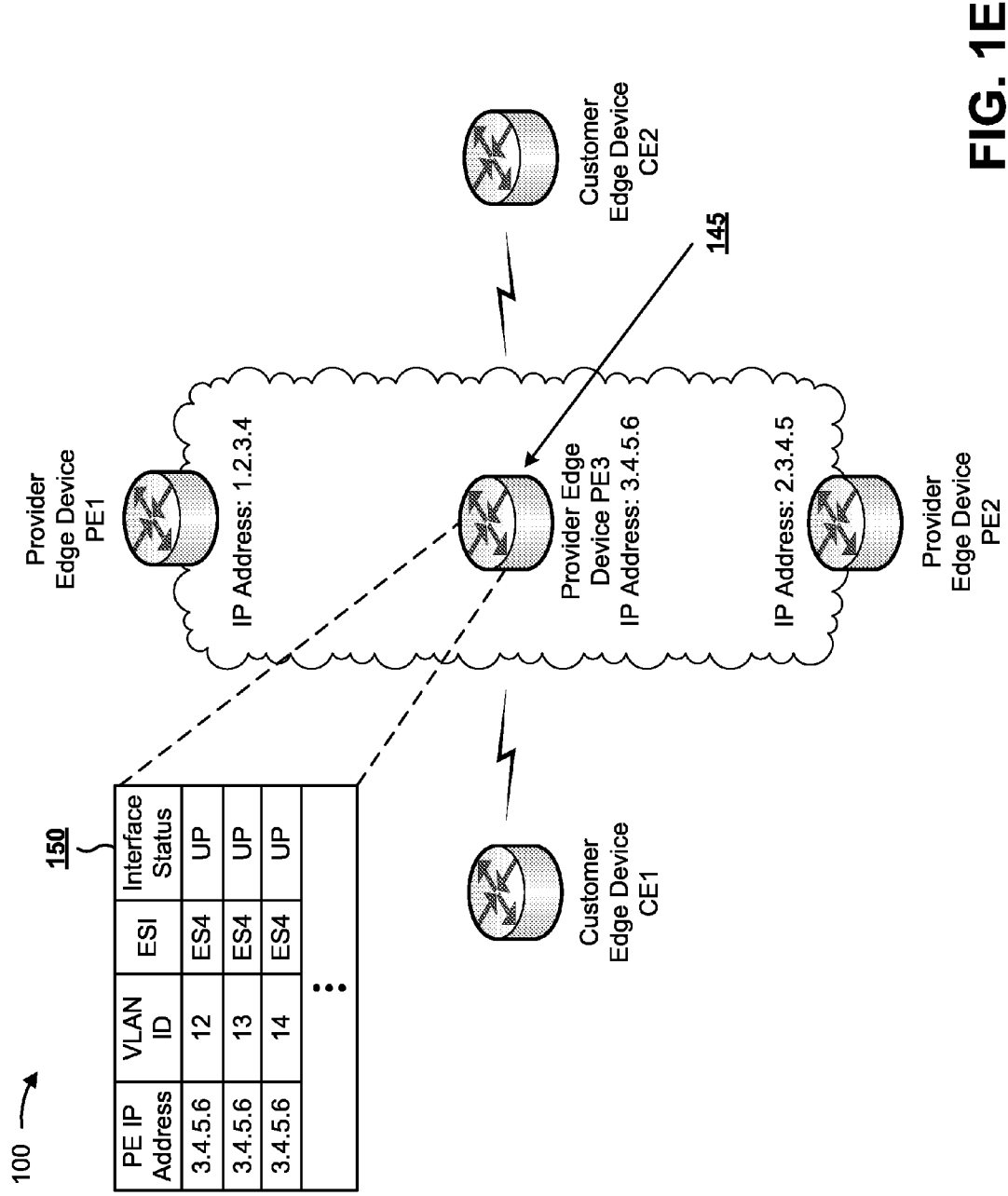

As shown in FIG. 1E, and by reference number 145, provider edge device PE3 may be added to the network. As shown by reference number 150, provider edge device PE3 may store a table having an IP address of 3.4.5.6 associated with VLAN identifiers 12, 13, and 14. The table for provider edge device PE3 may further include VLAN identifiers associated with the same ESI (e.g., ES4), thereby indicating that provider edge device PE3 is configured with an ESI per physical device. The table for provider edge device PE3 may further include the IP address, the VLAN identifiers, and the ESIs associated with an interface status of UP.

Figure 1F:
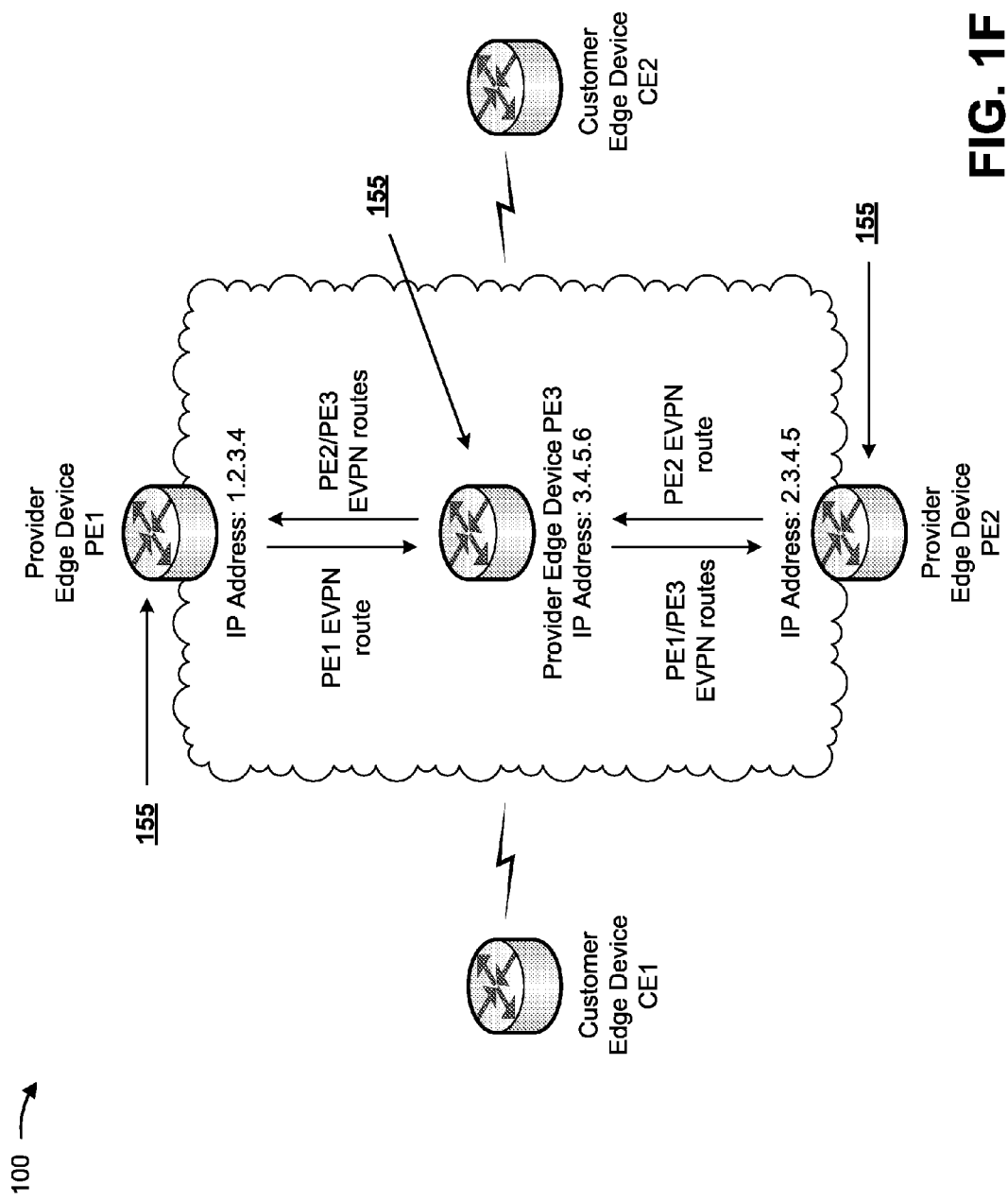

As shown in FIG. 1F, and by reference numbers 155, provider edge devices PE1, PE2, and PE3 may exchange EVPN routes that include a configuration identifier that identifies the ESI configuration as an ESI per physical device or an ESI per subinterface. In addition, provider edge devices PE1, PE2, and PE3 may each identify an ESI configuration of provider edge devices PE1, PE2, and PE3 using the configuration identifier included in the EVPN routes. For example, provider edge device PE1 may transmit an EVPN route for provider edge device PE1 to provider edge device PE3 and may receive EVPN routes for provider edge devices PE2 and PE3 from provider edge device PE3. As another example, provider edge device PE2 may receive EVPN routes for provider edge devices PE1 and PE3 from provider edge device PE3 and may transmit an EVPN route for provider edge device PE2 to provider edge device PE3.

Figure 1G:
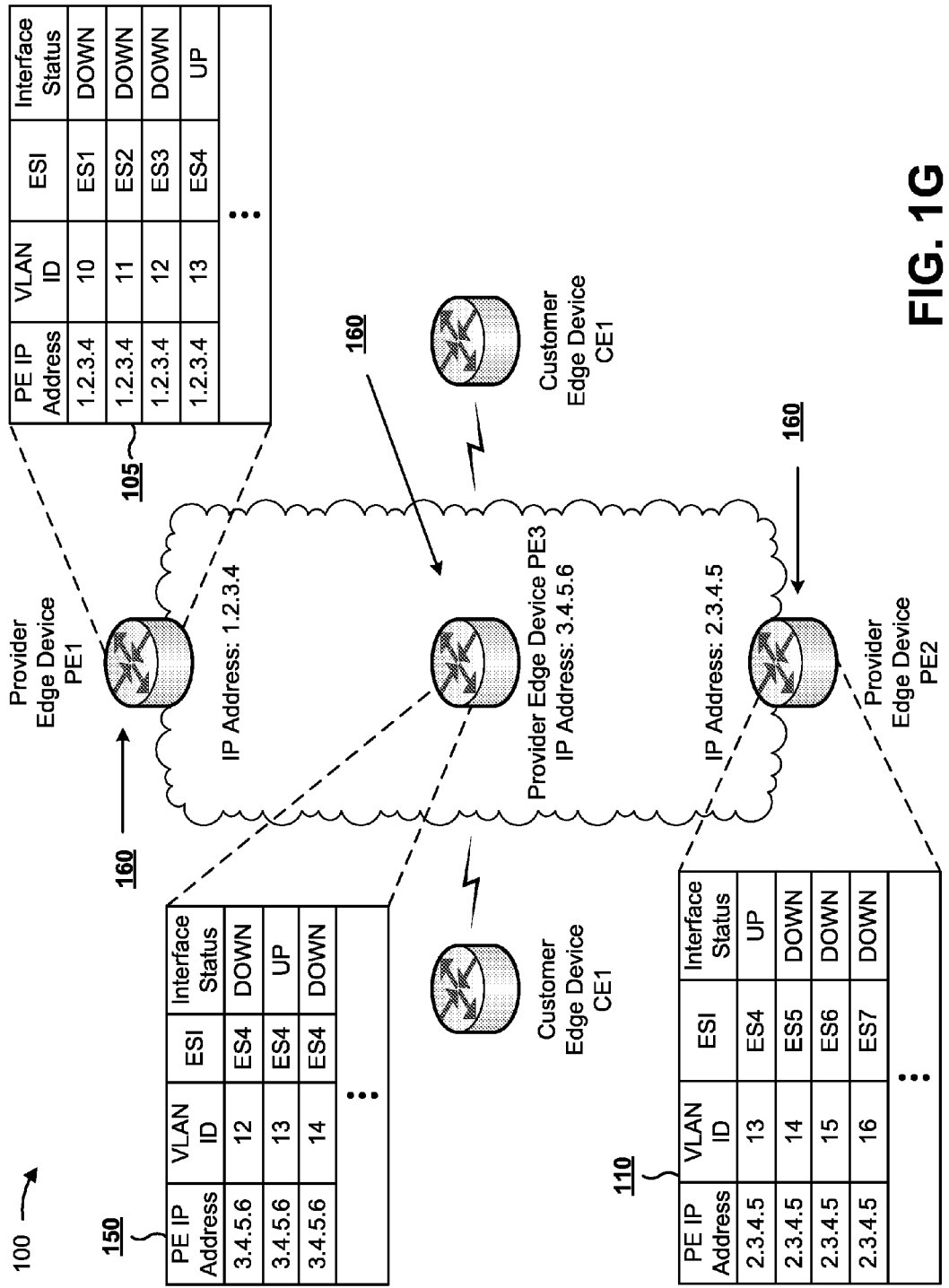

As shown in FIG. 1G, and by reference numbers 160, provider edge devices PE1, PE2, and PE3 may modify a status of subinterfaces based on the ESI configurations of provider edge devices PE1, PE2, and PE3. For example, provider edge devices PE1, PE2, and PE3 may use interfaces with the same ESI to communicate with each other. Continuing with the previous example, as shown by reference numbers 105, 110, and 150, the interface statuses for the VLAN identifiers have been set to DOWN, with the exception of the interface status associated with VLAN identifier 13, which is common to provider edge devices PE1, PE2, and PE3, and which has the same ESI (e.g., ES4) configured across provider edge device devices PE1, PE2, and PE3.

Figure 1H:
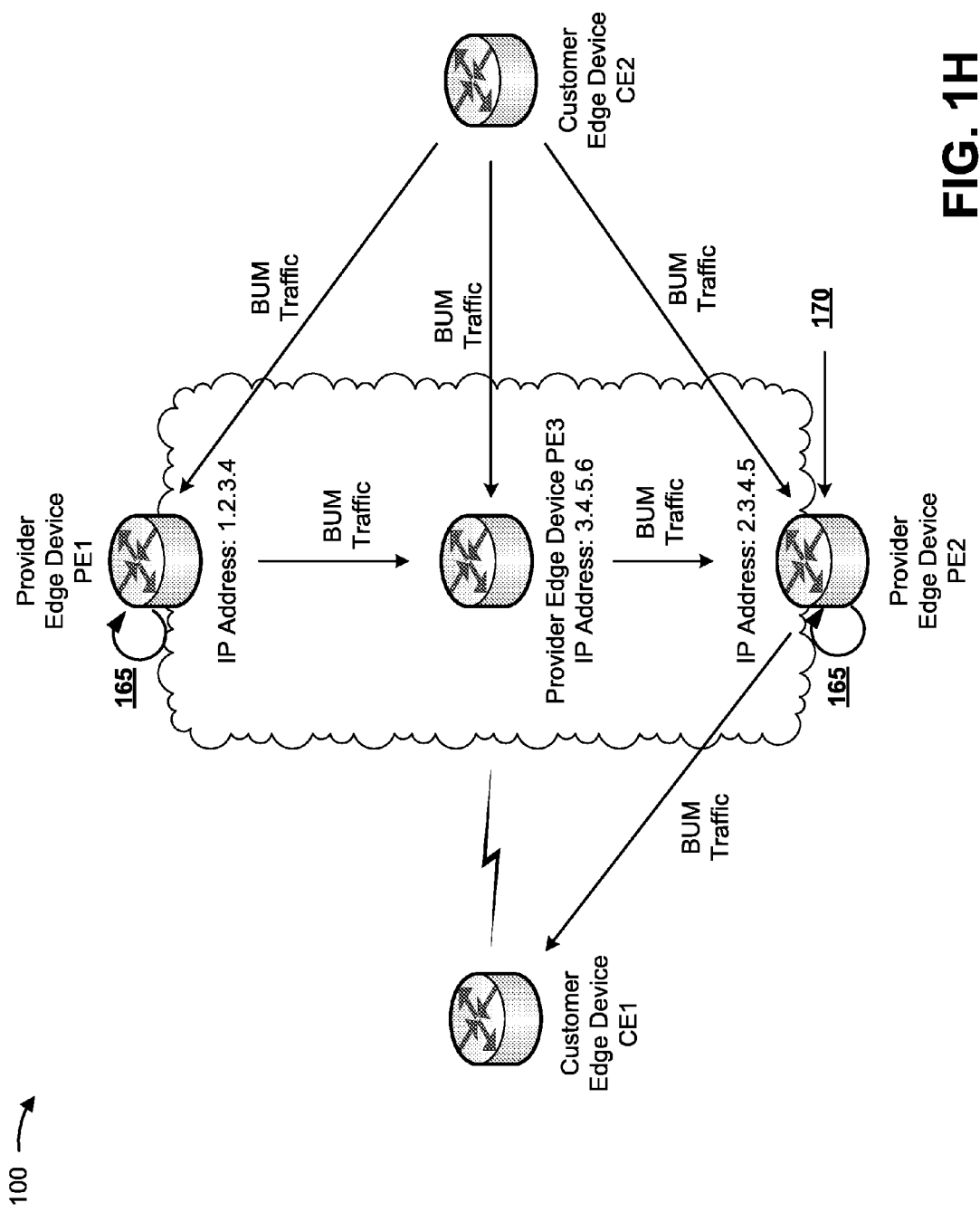

As shown by FIG. 1H, and by reference number 165, provider edge devices PE1 and PE2 may select provider edge device PE2 as the designated forwarder based on the VLAN identifier associated with the common ESI (e.g., may use VLAN identifier 13, associated with ESI ES4, as V in the algorithm V mod N). In addition, provider edge devices PE1 and PE2 may not consider PE3 for purposes of determining N in the algorithm V mod N, based on PE3 having a different ESI configuration from provider edge devices PE1 and PE2.

For example, PE1 and PE2 may use 2 as N, rather than 3, based on PE3 having a different ESI configuration from provider edge devices PE1 and PE2. Further, provider edge devices PE1 and PE2 may prevent provider edge device PE3 from selecting a designated forwarder (e.g., by transmitting a message to provider edge device PE3), based on provider edge device PE3 having a different ESI configuration from provider edge devices PE1 and PE2.

To select a designated forwarder, provider edge devices PE1 and PE2 may determine a result of 13 mod 2, compare the result to PE numbers included in the tables shown by reference numbers 120 and 125 described above, and select the corresponding provider edge device as the designated forwarder when the comparison indicates a match. For example, provider edge devices PE1 and PE2 may determine that the result of the algorithm 13 mod 2 is 1, may identify a PE number in the tables shown by reference numbers 120 and 125 that matches the result of the algorithm (e.g., may identify PE number 1 as matching the result of 1), determine that PE number 1 corresponds to provider edge device PE2, and select PE2 as the designated forwarder.

Conversely, and as another example, a result of 0 may cause provider edge devices PE1 and PE2 to select provider edge device PE1 as the designated forwarder (e.g., based on 0 matching PE number 0, which corresponds to provider edge device PE1). Provider edge devices PE1 and PE2 may provide information identifying the designated forwarder to provider edge device PE3, thereby enabling provider edge devices PE1, PE2, and PE3 to communicate with the same designated forwarder.

As further shown in FIG. 1H, provider edge devices PE1, PE2 and PE3 may receive BUM traffic from customer edge device CE2. As further shown in FIG. 1H, provider edge devices PE1 and PE3 may forward the BUM traffic to provider edge device PE2, based on PE2 having been selected as the designated forwarder. As shown by reference number 170, provider edge device PE2, as the designated forwarder, may forward the BUM traffic to customer edge device CE1. In this way, a layer 2 loop may be prevented.

As indicated above, FIGS. 1A-1H are provided merely as an example. Other examples are possible and may differ from what was described with regard to FIGS. 1A-1H.

Figure 2:
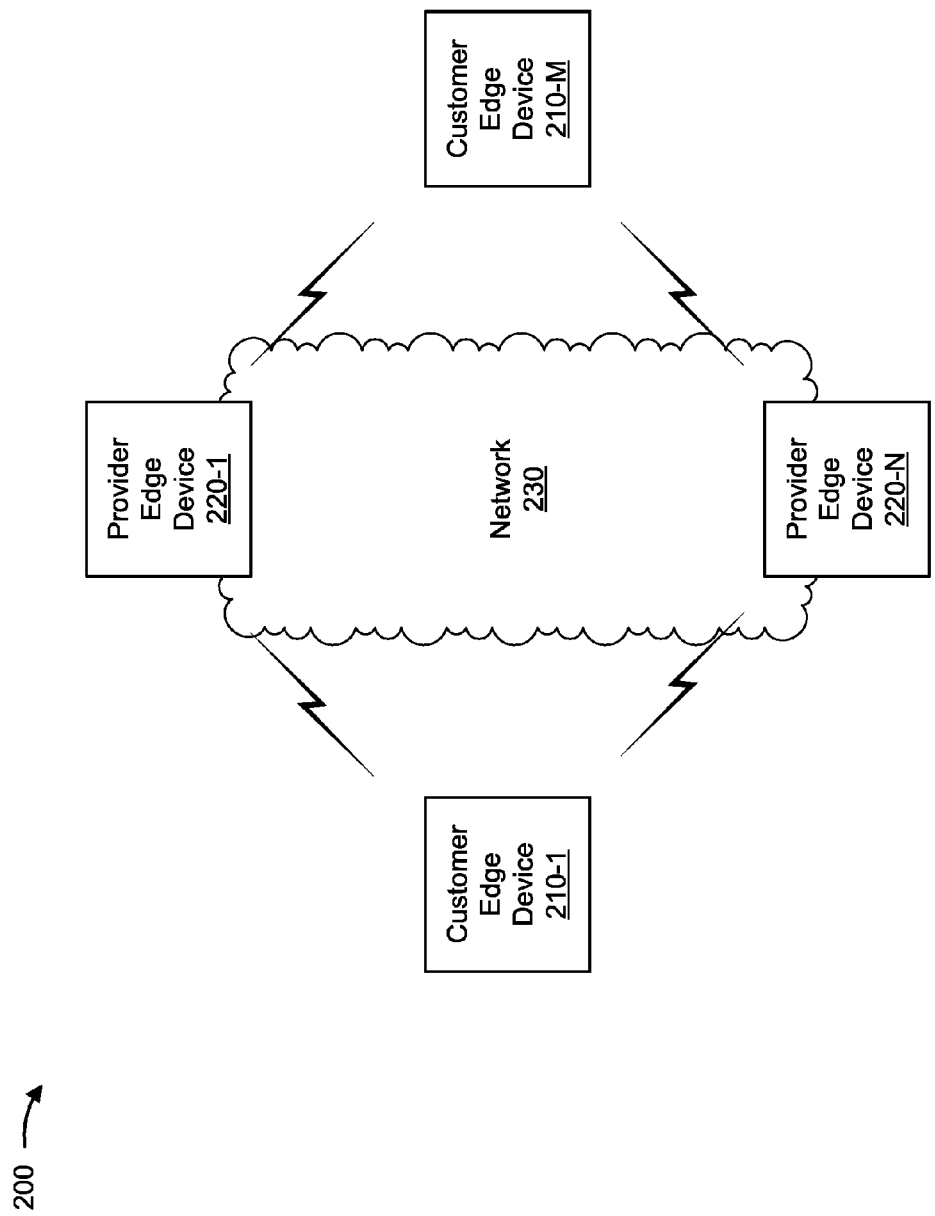
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more customer edge devices 210-1 through 210-M (M≥1) (hereinafter referred to collectively as "customer edge devices 210," and individually as "customer edge device 210"), one or more provider edge devices 220-1 through 220-N (N≥1) (hereinafter referred to collectively as "provider edge devices 220," and individually as "provider edge device 220"), and a network 230. Devices of environment 200 may interconnect via wired connections, wireless connections, or a combination of wired and wireless connections.

Customer edge device 210 includes one or more devices (e.g., one or more traffic transfer devices) capable of processing and/or transferring traffic. For example, customer edge device 210 may include a firewall, a router, a gateway, a switch, a hub, a bridge, a reverse proxy, a server (e.g., a proxy server), a security device, an intrusion detection device, a load balancer, or a similar type of device. In some implementations, customer edge device 210 may transmit traffic to provider edge device 220, as described elsewhere herein. Additionally, or alternatively, customer edge device 210 may receive traffic from provider edge device 220, as described elsewhere herein.

Provider edge device 220 includes one or more devices (e.g., one or more traffic transfer devices) capable of processing and/or transferring traffic between endpoint devices. For example, provider edge device 220 may include a firewall, a router, a gateway, a switch, a hub, a bridge, a reverse proxy, a server (e.g., a proxy server), a security device, an intrusion detection device, a load balancer, or a similar type of device. In some implementations, provider edge device 220 may receive traffic from customer edge device 210 and may provide the traffic to another customer edge device 210, as described elsewhere herein. Additionally, or alternatively, provider edge device (220) may receive traffic from customer edge device 210 and may provide the traffic to another provider edge device 220, as described elsewhere herein. In some implementations, provider edge device 220 may be associated with network 230, may have a particular configuration (e.g., an ESI configuration), and/or may store a set of EVPN routes, as described elsewhere herein.

Network 230 includes one or more wired and/or wireless networks. For example, network 230 may include a multiprotocol label switching (MPLS) network, a cellular network (e.g., a long-term evolution (LTE) network, a 3G network, or a code division multiple access (CDMA) network), a public land mobile network (PLMN), a local area network (LAN), a wide area network (WAN), a metropolitan area network (MAN), a telephone network (e.g., the Public Switched Telephone Network (PSTN)), an EVPN network, a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
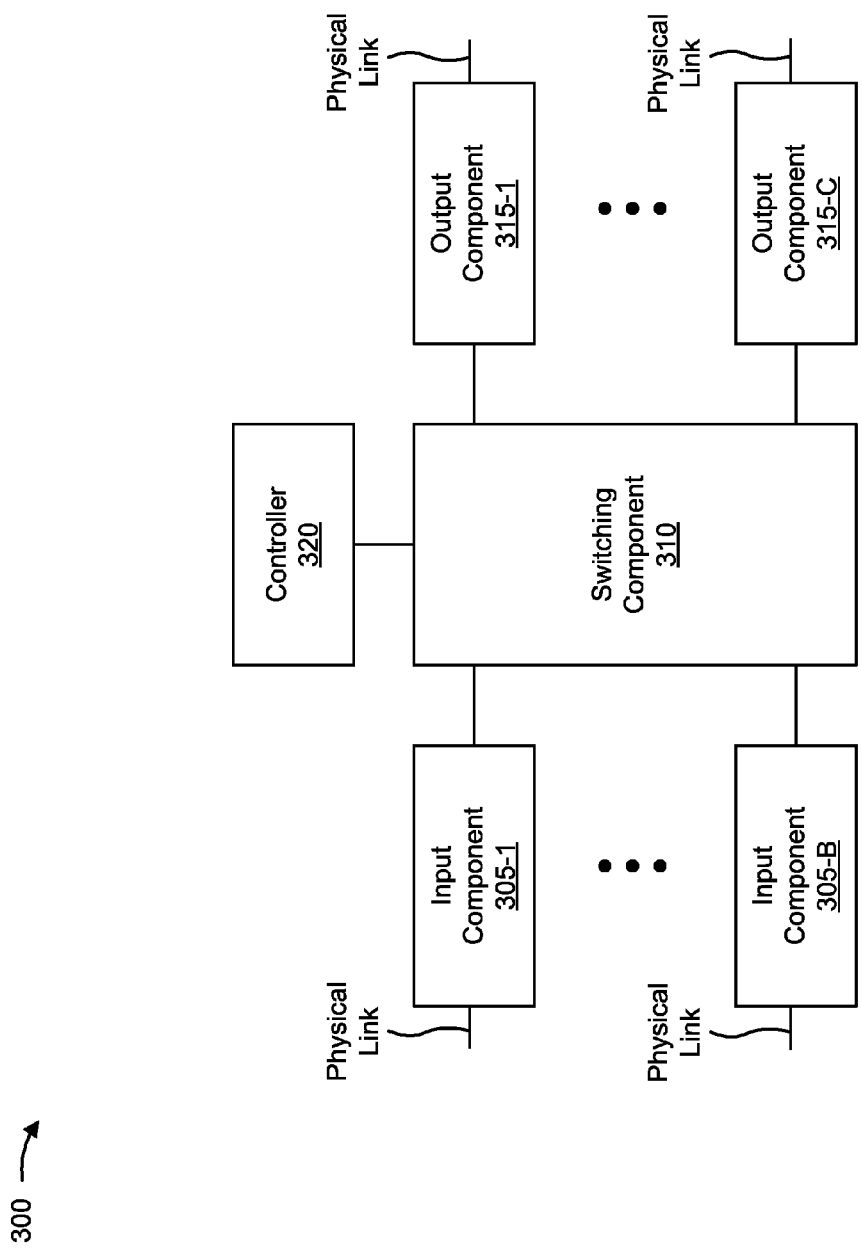
FIG. 3 is a diagram of example components of one or more devices of FIG. 2.

FIG. 3 is a diagram of example components of a device 300. Device 300 may correspond to customer edge device 210 and/or provider edge device 220. In some implementations, customer edge device 210 and/or provider edge device 220 may include one or more devices 300 and/or one or more components of device 300. As shown in FIG. 3, device 300 may include one or more input components 305-1 through 305-B (B≥1) (hereinafter referred to collectively as "input components 305," and individually as "input component 305"), a switching component 310, one or more output components 315-1 through 315-C (C≥1) (hereinafter referred to collectively as "output components 315," and individually as "output component 315"), and a controller 320.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., an input/output component may be a combination of input component 305 and output component 315).

Controller 320 is implemented in hardware, firmware, or a combination of hardware and software. Controller 320 includes a processor in the form of, for example, a central processing unit (CPU), a graphics processing unit (GPU), an accelerated processing unit (APU), a microprocessor, a microcontroller, a field-programmable gate array (FPGA), an application-specific integrated circuit (ASIC), and/or another type of processor that can interpret and/or execute instructions. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, or an optical memory) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
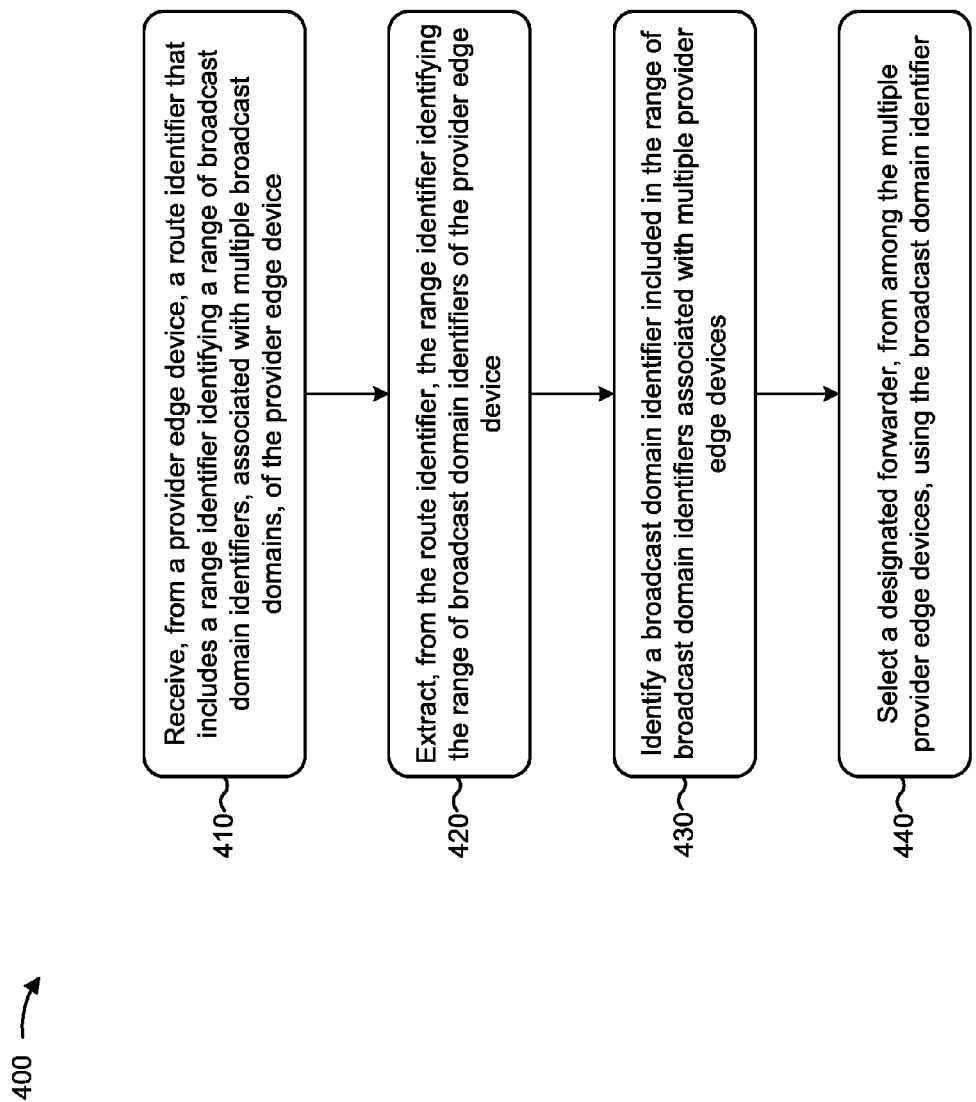
FIG. 4 is a flow chart of an example process for preventing data traffic loops associated with designated forwarder selection.

FIG. 4 is a flow chart of an example process 400 for preventing data traffic loops associated with designated forwarder selection. In some implementations, one or more process blocks of FIG. 4 may be performed by provider edge device 220. In some implementations, one or more process blocks of FIG. 4 may be performed by another device or a group of devices separate from or including provider edge device 220, such as customer edge device 210.

As shown in FIG. 4, process 400 may include receiving, from a provider edge device, a route identifier that includes a range identifier identifying a range of broadcast domain identifiers, associated with multiple broadcast domains, of the provider edge device (block 410). For example, provider edge device 220, when in an active-standby mode or an active-active mode, may receive, from another provider edge device 220, a route identifier that includes a range identifier identifying a range of broadcast domain identifiers, associated with multiple broadcast domains, of provider edge device 220.

In some implementations, a route identifier may include an identifier that identifies (e.g., encodes) a route for a particular provider edge device 220. For example, the route identifier may include network layer reachability information (NLRI) for provider edge device 220 or other information that identifies a route of provider edge device 220, such as an Ethernet virtual private network (EVPN) route. In some implementations, the route identifier may include a route type identifier that identifies a type of the route. For example, the route type identifier may identify the type of the route as a type 1 route identifier, a type 4 route identifier, or the like. In some implementations, a type 1 route may include an auto-discovery route per Ethernet segment, an auto-discovery route per EVPN instance (EVI), or the like. In some implementations, a type 4 route may include an Ethernet segment route. Additionally, or alternatively, the route identifier may include a route distinguisher that identifies the provider edge device, such as an Internet Protocol (IP) address. Additionally, or alternatively, the route identifier may include an ESI that identifies a particular Ethernet segment.

In some implementations, a range identifier may include an identifier that identifies a range of broadcast domain identifiers configured on provider edge device 220. For example, a range identifier may include VLAN identifiers, such as a range of VLAN identifiers (e.g., VLAN identifiers 10 to 15, 12 to 20, 1 to 13, etc.). In some implementations, a broadcast domain may include a logical division of a computer network in which all nodes can reach each other at the data link layer, (e.g., layer 2). For example, a broadcast domain may include a VLAN, a LAN, or the like.

In some implementations, provider edge device 220 may receive the route identifier from another provider edge device 220. For example, provider edge device 220 may receive the route identifier upon request by provider edge device 220. As another example, provider edge device 220 may receive the route identifier when provider edge device 220 powers on, boots up, and/or according to a schedule (e.g., periodically). Additionally, or alternatively, provider edge device 220 may receive the route identifier when an additional provider edge device 220 is added to a multi-homed environment (e.g., connected to network 230).

In some implementations, provider edge device 220 may receive route identifiers from multiple provider edge devices 220. For example, provider edge device 220 may receive a first route identifier from a first provider edge device 220 and a second route identifier from a second provider edge device 220. Additionally, or alternatively, provider edge device 220 may provide a route identifier to one or more other provider edge devices 220. In this way, multiple provider edge devices 220 connected network 230 may exchange route identifiers so that each of the provider edge devices 220 receives a route identifier from all other provider edge devices 220 connected to network 230.

In some implementations, a network administrator may further configure the route identifier to include an additional type-length-value (TLV) element, where the type may indicate a type of field with which the message is associated, the length may indicate a length (e.g., in bytes) of the value field, and the value may include data for the message with which the TLV element is associated. In some implementations, provider edge device 220 may use the TLV element to provide information associated with provider edge device 220. For example, the TLV element to include a range identifier that identifies a range of broadcast domain identifiers configured on provider edge device 220. To illustrate, assume that provider edge device 220 is configured with VLAN identifiers 10 to 20. In this case, the range identifier may identify that the range of VLAN identifiers configured on provider edge device 220 includes VLAN identifiers 10 to 20. In this way, provider edge device 220 may use a TLV element to exchange information associated with broadcast domain identifiers configured on provider edge device 220.

As further shown in FIG. 4, process 400 may include extracting, from the route identifier, the range identifier identifying the range of broadcast domain identifiers of the provider edge device (block 420). For example, provider edge device 220 may extract, from the route identifier, the range identifier identifying the range of broadcast domain identifiers of provider edge device 220.

In some implementations, provider edge device 220 may process the route identifier to extract the range identifier. In some implementations, when processing the route identifier, provider edge device 220 may parse the route identifier to extract the range identifier. Additionally, or alternatively, provider edge device 220 may extract the range identifier according to a set of rules, such as a set of rules that indicate a manner in which to process the route identifier to extract the range identifier, a set of rules that indicate an octet position of the range identifier in the route identifier, or the like. Additionally, or alternatively, provider edge device 220 may process the route identifier based on information identifying a format or a structure of the route identifier.

In some implementations, provider edge device 220 may extract multiple range identifiers from multiple route identifiers. For example, provider edge device 220 may extract a first range identifier from a first route identifier for a first provider edge device 220 and may extract a second range identifier from a second route identifier for a second provider edge device 220. In this way, provider edge device 220 may identify a range of broadcast domain identifiers associated with one or more other provider edge devices 220.

In some implementations, provider edge device 220 may store the range identifier based on, or in association with, extracting the range identifier. For example, provider edge device 220 may store the range identifier in a data structure. In some implementations, the data structure may include a table stored by provider edge device 220.

As further shown in FIG. 4, process 400 may include identifying a broadcast domain identifier included in the range of broadcast domain identifiers associated with multiple provider edge devices (block 430). For example, provider edge device 220 may identify a broadcast domain identifier included in multiple ranges of broadcast domain identifiers, which are associated with multiple provider edge devices 220. Continuing with the previous example, provider edge device 220 may identify a domain identifier that is included in each of a first range of broadcast domain identifiers, associated with a first provider edge device 220, and a second range of broadcast domain identifiers, associated with a second provider edge device 220.

In some implementations, provider edge device 220 may identify a broadcast domain identifier that is included in multiple range identifiers received from provider edge devices 220. For example, provider edge device 220 may identify a minimum broadcast domain identifier (e.g., with a minimum value relative to other broadcast domain identifiers) that is common to multiple provider edge devices 220 by using the range identifiers from the multiple provider edge devices 220 to identify the minimum value broadcast identifier that is included in the range identifiers from the multiple provider edge devices 220. Additionally, or alternatively, provider edge device 220 may identify a maximum broadcast domain identifier (e.g., with a maximum value relative to other broadcast domain identifiers) that is common to multiple provider edge devices 220 by using the range identifiers from the multiple provider edge devices 220 to identify a maximum value broadcast domain identifier that is included in the range identifiers from the multiple provider edge devices 220.

In some implementations, provider edge device 220 may compare a range identifier of provider edge device 220 and range identifiers of one or more other provider edge devices 220 to identify the broadcast domain identifier. For example, provider edge device 220 may compare a first range identifier that identifies a first VLAN identifier range of 10 to 15 for a first provider edge device 220 and a second range identifier that identifies a second VLAN identifier range of 12 to 20 for a second provider edge device 220. In such a case, provider edge device 220 may identify VLAN identifier 12 as a minimum VLAN identifier that is common to the first provider edge device 220 and the second provider edge device 220 based on 12 being the minimum value VLAN identifier that is included in both the first VLAN identifier range and the second VLAN identifier range.

Additionally, or alternatively, provider edge device 220 may compare range identifiers of provider edge device 220 and one or more other provider edge devices 220 to identify a maximum broadcast domain identifier that is common to a first provider edge device 220 and a second provider edge device 220. For example, provider edge device 220 may compare a first range identifier that identifies a first VLAN identifier range of 10 to 15 for a first provider edge device 220 and a second range identifier that identifies a second VLAN identifier range of 12 to 20 for a second provider edge device 220. In such a case, provider edge device 220 may identify VLAN identifier 15 as a maximum VLAN identifier that is common to the first provider edge device 220 and the second provider edge device 220 based on 15 being the maximum value VLAN identifier that is included in both the first VLAN identifier range and the second VLAN identifier range.

In some cases, a broadcast domain identifier may not be common among all provider edge devices 220 connected to network 230 (e.g., in a multihomed environment). In such cases, and in some implementations, provider edge device 220 may select a broadcast domain identifier according to a set of rules. For example, provider edge device 220 may select a broadcast domain identifier that is configured on a threshold quantity of provider edge devices 220 in the multihomed environment, a threshold percentage of provider edge devices 220 in the multihomed environment, or the like. Additionally, or alternatively, provider edge device 220 may provide, to other provider edge devices 220 that are not configured with the selected broadcast domain identifier, information that identifies the broadcast domain to use during designated forwarder selection (e.g., election). In this way, compatibility among provider edge devices 220 that have different configurations of broadcast domain identifiers may be enabled by enabling provider edge device 220 to obtain information about broadcast domain identifiers configured on other provider edge devices 220.

As further shown in FIG. 4, process 400 may include selecting a designated forwarder, from among the multiple provider edge devices, using the broadcast domain identifier (block 440). For example, provider edge device 220 may select (e.g., elect) a designated forwarder, from among the multiple provider edge devices 220, using a minimum broadcast domain identifier. As another example, provider edge device 220 may select a designated forwarder, from among the multiple provider edge devices 220, using a maximum broadcast identifier.

In some implementations, provider edge device 220 may select a designated forwarder from among multiple provider edge devices 220 in a multihomed environment using an algorithm, such as a V mod N type of algorithm, where V is a broadcast domain identifier, and N is a quantity of provider edge devices 220 in the multihomed environment. For example, provider edge device 220 may select a designated forwarder using the broadcast domain identifier that is common to, or configured across, multiple provider edge devices 220 (e.g., as V in the algorithm V mod N). In this way, provider edge device 220 may reduce or eliminate errors associated with selecting a designated forwarder that can occur when provider edge devices 220 in a multihomed environment are configured with different ranges of broadcast domain identifiers by using a broadcast domain identifier that is common among multiple provider edge devices 220.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
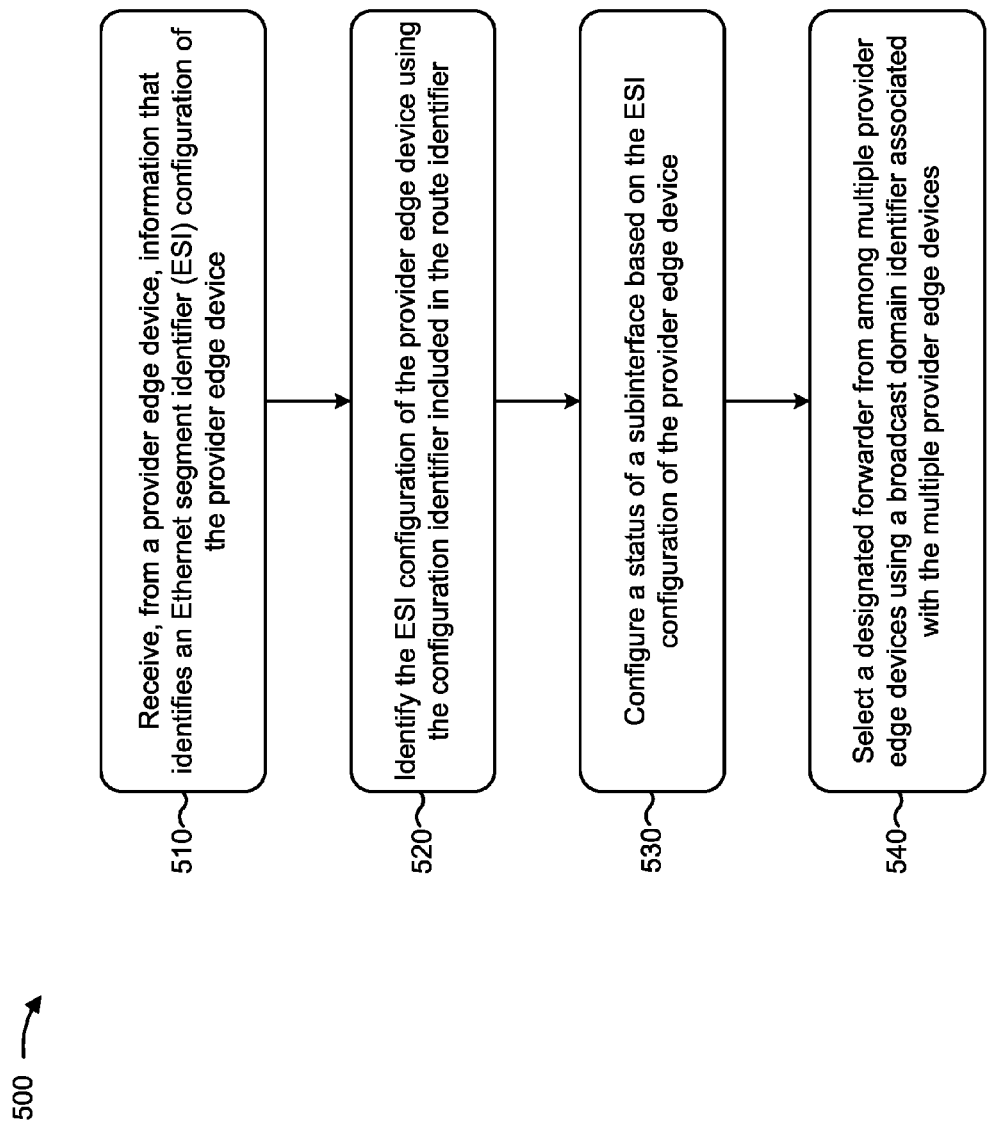
FIG. 5 is a flow chart of another example process for preventing data traffic loops associated with designated forwarder selection.

FIG. 5 is a flow chart of an example process 500 for preventing data traffic loops associated with designated forwarder selection. In some implementations, one or more process blocks of FIG. 5 may be performed by provider edge device 220. In some implementations, one or more process blocks of FIG. 5 may be performed by another device or a group of devices separate from or including provider edge device 220, such as customer edge device 210.

As shown in FIG. 5, process 500 may include receiving, from a provider edge device, information that identifies an Ethernet segment identifier (ESI) configuration of the provider edge device (block 510). For example, provider edge device 220, in an active-active mode or an active-standby mode, may receive, from another provider edge device 220, a route identifier that includes a configuration identifier that identifies an ESI configuration of the other provider edge device 220.

In some implementations, an ESI configuration may include an ESI configured per physical device. For example, each provider edge device 220 may be configured with a single ESI, such that all subinterfaces (e.g., VLANs) of provider edge device 220 are associated with the same ESI. In some implementations, an ESI configuration may include an ESI configured per subinterface. For example, each subinterface of provider edge device 220 may be configured with a different ESI, such that each subinterface of provider edge device 220 is associated with a different ESI.

In some implementations, an ESI may identify an Ethernet segment (e.g., a set of links) between customer edge device 210 and one or more provider edge devices 220. For example, an ESI may include a unique non-zero identifier that identifies an Ethernet segment. In some implementations, provider edge device 220 may receive a route identifier that includes a configuration identifier that identifies an ESI configuration of provider edge device 220.

In some implementations, provider edge device 220 may receive a configuration identifier from another provider edge device 220. For example, provider edge device 220 may receive the configuration identifier from the other provider edge device 220 upon request by provider edge device 220, when provider edge device 220 powers on or boots up, and/or according to a schedule (e.g., periodically). Additionally, or alternatively, provider edge device 220 may receive the configuration identifier when an additional provider edge device 220 is added to a multihomed environment (e.g., connected to network 230).

In some implementations, provider edge device 220 may receive a configuration identifier from multiple provider edge devices 220. For example, provider edge device 220 may receive a first configuration identifier from a first provider edge device 220 and a second configuration identifier from a second provider edge device 220. Additionally, or alternatively, provider edge device 220 may provide a configuration identifier to other provider edge devices 220.

In some implementations, a network administrator may configure a route identifier to include a TLV element. For example, provider edge device 220 may use the TLV element to store a configuration identifier. Continuing with the previous example, a configuration identifier of 00, included in the TLV element, may identify an ESI configuration of provider edge device 220 as an ESI per physical device. Continuing with the previous example, a configuration identifier of 11, included in the TLV element, may identify an ESI configuration of provider edge device 220 as an ESI configured per subinterface. In this way, provider edge devices 220 may use a route identifier that includes a TLV element, to exchange configuration identifiers.

As further shown in FIG. 5, process 500 may include identifying the ESI configuration of the provider edge device using the configuration identifier included in the route identifier (block 520). For example, provider edge device 220 may identify the ESI configuration of another provider edge device 220 using the configuration identifier included in the route identifier received from the other provider edge device 220. In some implementations, provider edge device 220 may identify the ESI configuration based on, or in association with, receiving the route identifier.

In some implementations, provider edge device 220 may parse the route identifier to identify the configuration identifier. For example, provider edge device 220 may parse the route identifier using a set of rules and/or information identifying a structure of the route identifier to identify the configuration identifier. In some implementations, provider edge device 220 may identify the ESI configuration of a particular provider edge device 220, associated with the route identifier, based on identifying the configuration identifier. For example, provider edge device 220 may identify the configuration of another provider edge device 220 as an ESI per physical device based on identifying a configuration identifier of 00 in a TLV element included the route identifier. As another example, provider edge device 220 may identify the configuration of another provider edge device 220 as an ESI per subinterface based on identifying a configuration identifier of in a TLV element included in the route identifier.

In some implementations, provider edge device 220 may identify the ESI configuration of another provider edge device 220 using a data structure. For example, provider edge device 220 may compare the configuration identifier to a set of configuration identifiers and corresponding ESI configurations to identify the ESI configuration of the other provider edge device 220. In some implementations, provider edge device 220 may identify the ESI configuration when the comparison indicates a match.

In some implementations, provider edge device 220 may identify an ESI configuration of a particular provider edge device 220 based on whether a configuration identifier is included in a route identifier from the other provider edge device 220. For example, when a configuration identifier is included in a route identifier, provider edge device 220 may identify a first ESI configuration. As another example, when a configuration identifier is not included in a route identifier, provider edge device 220 may identify a second ESI configuration.

In this way, provider edge device 220 may use information included in a route identifier to identify an ESI configuration of another provider edge device 220.

As shown in FIG. 5, process 500 may include configuring a status of a subinterface based on the ESI configuration of the provider edge device (block 530). For example, provider edge device 220 may configure a status of a subinterface of provider edge device 220 based on the ESI configuration of provider edge device 220. In some implementations, provider edge device 220 may configure a status of a subinterface based on identifying the ESI configuration.

In some implementations, provider edge device 220 may automatically configure the status of a broadcast domain in association with identifying the ESI configuration of the provider edge device 220. For example, when configuring a status of a subinterface, provider edge device 220 may automatically configure a status of a VLAN as up or down, active or inactive, or the like, based on the ESI configuration of provider edge device 220 and/or another provider edge device 220.

To illustrate, assume that a first provider edge device 220 is configured with an ESI per subinterface and the first provider edge device 220 exchanges route identifiers with a second provider edge device 220 configured with an ESI per physical device. In such a case, the first and second provider edge devices 220 may identify a common ESI between the first and the second provider edge devices 220 using information included in the route identifier. In some implementations, when the first and second provider edge devices 220 identify the common ESI, the first and second provider edge devices 220 may set a status of a broadcast domain associated with the common ESI to up, active, or the like, to transmit traffic, such as BUM traffic, using the broadcast domain associated with the common ESI. For example, the first and second provider edge devices 220 may set a status of the broadcast domain to permit the first and second provider edge devices 220 to transmit and/or receive IP traffic, BUM traffic, etc.

Additionally, or alternatively, the first and the second provider edge devices 220 may set a status of other broadcast domains, such as broadcast domains that are not associated with the common ESI, to down, inactive, or the like, to prevent transmission of traffic via the broadcast domains not associated with the common ESI. In this way, layer 2 loops that may occur due to a mismatch of ESI configurations between two communicating provider edge devices 220 may be prevented by using broadcast domains that are associated with ESIs that are common to (e.g., configured on) the communicating provider edge devices 220.

As further shown in FIG. 5, process 500 may include selecting a designated forwarder from among multiple provider edge devices using a broadcast domain identifier associated with the multiple provider edge devices (block 540). For example, provider edge device 220 may select (e.g., elect) a designated forwarder from among multiple provider edge devices 220 using a broadcast domain identifier that is a minimum broadcast domain identifier or a maximum broadcast domain identifier of the multiple provider edge devices 220. In some implementations, provider edge device 220 may select the designated forwarder based on, or in association with, configuring a status of a subinterface.

In some implementations, provider edge device 220 may select a designated forwarder from among provider edge devices 220 in a multihomed environment using an algorithm, such as V mod N, where V is a broadcast domain identifier and N is a quantity of provider edge devices 220 in the multihomed environment. In some implementations, when selecting a designated forwarder, provider edge devices 220 that are configured with a particular ESI configuration may not be included in a quantity of provider edge devices 220 used in the algorithm V mod N (e.g., used as N). For example, provider edge devices 220 that are configured with an ESI per physical device may be excluded from the quantity of devices used as N in the algorithm V mod N. Conversely, and as another example, provider edge devices 220 that are configured with an ESI per subinterface may be excluded from the quantity of devices used as N in the algorithm V mod N.

Additionally, or alternatively, provider edge devices 220 that are configured with a particular ESI configuration may be prevented from selecting a designated forwarder. For example, a first provider edge device 220 configured with an ESI per subinterface may prevent a second provider edge device 220 configured with an ESI per physical device from using the algorithm to select a designated forwarder (e.g., by transmitting a message or a command to the second provider edge device 220). Conversely, and as another example, a first provider edge device 220 configured with an ESI per physical device may prevent a second provider edge device 220 configured with an ESI per subinterface from using the algorithm to select a designated forwarder (e.g., by transmitting a message or a command to the second provider edge device 220). This conserves processing resources of provider edge devices 220 that are configured with the particular ESI configuration by preventing provider edge devices 220 from participating in designated forwarder selection.

In some implementations, provider edge devices 220 that are prevented from selecting a designated forwarder may receive, from another provider edge device 220 (e.g., a provider edge device 220 that has participated in designated forwarder selection), information that identifies the selected designated forwarder. In this way, errors that may occur from selecting a designated forwarder from provider edge devices 220 that have different ESI configurations may be reduced or eliminated by excluding provider edge devices 220 with a particular ESI configuration from designated forwarder selection.

In some instances, a provider edge device 220 that is not configured to exchange broadcast domain identifiers and/or configuration identifiers (e.g., using a TLV element in a route identifier) may be added to, or operating within, a multihomed environment (e.g., network 230). For example, a first provider edge device 220 may receive a route identifier from a second provider edge device 220 that does not include a TLV element that includes a broadcast domain identifier and/or a configuration identifier (e.g., based on the second provider edge device 220 not being configured to use a TLV element to exchange broadcast domain identifiers and/or configuration identifiers).

In some implementations, when provider edge device 220 receives a route identifier that does not include a broadcast domain identifier and/or a configuration identifier (e.g., in a TLV element), provider edge device 220 may identify an ESI included in the route identifier by parsing the route identifier, such as by using a set of rules, information that identifies a structure of the route identifier, or the like. In some implementations, provider edge device 220 may compare an ESI extracted from the route identifier and ESIs configured on provider edge device 220 to identify a common ESI (e.g., common to provider edge device 220 and another provider edge device 220 that transmitted the route identifier).

In some implementations, provider edge device 220 may set a status of a broadcast domain and/or a subinterface based on the comparison indicating a match. For example, provider edge device 220 may set a status of a broadcast domain associated with the same ESI included in the received route identifier to up, active, or the like. Additionally, or alternatively, provider edge device 220 may set a status of other broadcast domains associated with different ESIs than the ESI included in the received route identifier to down, inactive, or the like. In some implementations, provider edge device 220 may communicate using a broadcast domain with a status of up, active, or the like. This reduces or eliminates communication errors, such as layer 2 loops, that may occur when provider edge devices 220 that are not configured to exchange route identifiers and/or configuration identifiers using a route identifier.

In some implementations, provider edge device 220 may provide a message, such as a syslog message or an alert, to another device (e.g., for display). For example, provider edge device 220 may provide a message that indicates that a particular provider edge device 220 not configured to exchange broadcast domain identifiers and/or configuration identifiers, such as by using a TLV element included in a route identifier, has been connected to, or is operating within, network 230.

In this way, provider edge device 220, configured to exchange route identifiers with a TLV element that includes a broadcast domain identifier and/or a configuration identifier, may be compatible with (e.g., can communicate with) another provider edge device 220, not configured to transmit a route identifier with a TLV, by adaptively configuring a status of subinterfaces of provider edge device 220. Additionally, communications between a first provider edge device 220, configured with an ESI per subinterface, and a second provider edge device 220, configured with an ESI per physical device, may be improved by reducing or eliminating layer 2 loops, or other communication errors, that may occur as a result of a mismatch in ESI configurations.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Implementations described herein enable a provider edge device to exchange route identifiers that include information identifying a broadcast domain and/or an ESI configuration (e.g., using a TLV element included in the route identifier). Having a provider edge device exchange route identifiers that include information identifying a broadcast domain and/or an ESI configuration may enable provider edge devices configured with different broadcast domain identifiers and/or ESI configurations to select a designated forwarder using the same information, thereby reducing or eliminating layer 2 loops that may occur during designated forwarder selection.

Additionally, or alternatively, implementations described herein enable a provider edge device that is configured to transmit a route identifier that includes information identifying a broadcast domain and/or an ESI configuration to be compatible with another provider edge device that is not configured to transmit a route identifier that includes the information identifying a broadcast domain and/or an ESI configuration by adaptively configuring a status of subinterfaces of the provider edge device. This improves communication between the provider edge device and the other provider edge device by reducing or eliminating errors due to different configurations associated with using a route identifier to exchange information identifying a broadcast domain and/or an ESI configuration.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. device; comprising:
   one or more memories; and
   one or more processors to:
      receive a route identifier that includes a range identifier or a configuration identifier,
         the range identifier identifying a range of broadcast domain identifiers associated with a first device,
         the configuration identifier identifying an Ethernet segment identifier (ESI) configuration of the first device;
      identify the range identifier or the configuration identifier included in the route identifier;
      select a designated forwarder from among multiple devices based on the range of broadcast domain identifiers or based on identifying the configuration identifier,
         the designated forwarder being a same designated forwarder selected by at least one other device, and
         the designated forwarder being selected using a quantity of devices that excludes the first device;
      provide a message to the first device to prevent the first device from selecting the designated forwarder based on the configuration identifier; and
      provide, to the first device, information identifying the designated forwarder.

2. The device of claim 1, where the one or more processors are further to:
   receive another route identifier that does not include the range identifier or the configuration identifier;
   process the other route identifier to identify an ESI included in the route identifier;
   perform a comparison of the ESI included in the route identifier and a set of ESIs associated with the device;

identify a particular ESI where the comparison indicates a match; and
configure a status of a broadcast domain or an interface of the device based on the comparison indicating the match,
the broadcast domain or the interface being associated with the particular ESI.

3. The device of claim 1, where the one or more processors are further to:
configure a status of a first broadcast domain or a first interface of the first device,
the first broadcast domain or the first interface being associated with a particular ESI; and
configure a status of a second broadcast domain or a second interface of the first device,
the second broadcast domain or the second interface being associated with an ESI different than the particular ESI.

4. The device of claim 1, where the one or more processors are further to:
identify a broadcast domain identifier configured across the multiple devices,
the broadcast domain identifier being included in the range of broadcast domain identifiers; and
where the one or more processors, when selecting the designated forwarder, are to:
select the designated forwarder using the broadcast domain identifier.

5. The device of claim 1, where the route identifier includes a type-length-value (TLV) element,
the TLV element including the range identifier or the configuration identifier.

6. The device of claim 1, where the route identifier includes:
information identifying the route identifier as a type 1 route identifier, or
information identifying the route identifier as a type 4 route identifier.

7. A non-transitory computer-readable medium storing instructions, the instructions comprising:
one or more instructions that, when executed by one or more processors, cause the one or more processors to:
receive, from multiple provider edge devices, multiple route identifiers that include multiple range identifiers or multiple configuration identifiers,
the multiple range identifiers or the multiple configuration identifiers being included in a type-length-value (TLV) element of the multiple route identifiers,
a first range identifier included in a first route identifier of the multiple route identifiers being different than a second range identifier included in a second route identifier of the multiple route identifiers,
a first configuration identifier included in the first route identifier being different than a second configuration identifier included in the second route identifier;
extract the multiple range identifiers or the multiple configuration identifiers from the TLV element of the multiple route identifiers;
identify the multiple range identifiers or the multiple configuration identifiers based on extracting the multiple range identifiers or the multiple configuration identifiers; and
elect a designated forwarder from among the multiple provider edge devices using an algorithm,
the algorithm being a same algorithm used by the multiple provider edge devices to elect a same designated forwarder.

8. The non-transitory computer-readable medium of claim 7, where the one or more instructions, when executed by the one or more processors, further cause the one or more processors to:
identify a broadcast domain identifier included in the first range identifier and the second range identifier; and
where the one or more instructions, that cause the one or more processors to elect the designated forwarder, cause the one or more processors to:
elect the designated forwarder using the broadcast domain identifier as an input to the algorithm.

9. The non-transitory computer-readable medium of claim 8, where the broadcast domain identifier has a minimum value of one or more broadcast domain identifiers included in the first range identifier and the second range identifier.

10. The non-transitory computer-readable medium of claim 7, where the one or more instructions, when executed by one or more processors, further cause the one or more processors to:
identify a first Ethernet segment identifier (ESI) configuration associated with the first configuration identifier;
identify a second ESI configuration associated with the second configuration identifier;
determine a quantity to input to the algorithm,
the quantity identifying a quantity of provider edge devices associated with the first ESI configuration or the second ESI configuration; and
where the one or more instructions, that cause the one or more processors to elect the designated forwarder, cause the one or more processors to:
elect the designated forwarder using the quantity as an input to the algorithm.

11. The non-transitory computer-readable medium of claim 7, where the one or more instructions, when executed by the one or more processors, further cause the one or more processors to:
configure a status of one or more subinterfaces of the multiple provider edge devices based on the first configuration identifier or the second configuration identifier; and
where the one or more instructions, that cause the one or more processors to elect the designated forwarder, cause the one or more processors to:
elect the designated forwarder in association with configuring the status of the one or more subinterfaces.

12. The non-transitory computer-readable medium of claim 7, where the first configuration identifier identifies an Ethernet segment identifier (ESI) per device configuration.

13. The non-transitory computer-readable medium of claim 7, where the second configuration identifier identifies an Ethernet segment identifier (ESI) per subinterface configuration.

14. A method, comprising:
receiving, by a device, one or more route identifiers from one or more other devices,
the one or more route identifiers including:
one or more range identifiers associated with one or more ranges of broadcast domain identifiers configured on the one or more other devices, or
one or more configuration identifiers associated with one or more Ethernet segment identifier (ESI) configurations of the one or more other devices;

identifying, by the device, the one or more range identifiers or the one or more configuration identifiers included in the one or more route identifiers,
the one or more range identifiers including at least one range identifier that is different than a range identifier configured on another device, or
the one or more configuration identifiers including at least one configuration identifier that is different than a configuration identifier configured on another device; and
selecting, by the device, a designated forwarder from among the device and the one or more other devices,
the designated forwarder being selected using a quantity of devices that excludes the one or more other devices;
providing, by the device, a message to the one or more other devices to prevent the one or more other devices from selecting the designated forwarder based on the configuration identifier; and
providing, by the device and to the one or more other devices, information identifying the designated forwarder.

15. The method of claim 14, further comprising:
identifying a broadcast domain identifier included in the one or more ranges of broadcast identifiers;
transmitting, to at least one device of the one or more other devices, information identifying the broadcast domain identifier to use when selecting the designated forwarder; and
where selecting the designated forwarder comprises:
selecting the designated forwarder from among the device and the one or more other devices using the broadcast domain identifier,
the designated forwarder being a same designated forwarder selected by the at least one device of the one or more other devices.

16. The method of claim 14,
where selecting the designated forwarder comprises:
selecting the designated forwarder using the quantity of devices as an input to an algorithm.

17. The method of claim 14, further comprising:
receiving at least one route identifier that does not include the one or more range identifiers or the one or more configuration identifiers; and
configuring a status of a broadcast domain or a subinterface based on receiving the at least one route identifier that does not include the one or more range identifiers or the one or more configuration identifiers.

18. The method of claim 14, where a broadcast domain identifier, included in the one or more ranges of broadcast domain identifiers, identifies a virtual local area network (VLAN).

19. The device of claim 1, where the route identifier includes a type-length-value (TLV) element,
the TLV element including the range identifier or the configuration identifier, and
the TLV element is included in a type 4 route.

20. The method of claim 14, where the one or more route identifies include a type-length-value (TLV) element,
the TLV element including a range identifier of the one or more range identifiers or a configuration identifier of the one or more configuration identifiers, and
the TLV element is included in a type 4 route.

* * * * *